(12) United States Patent
Marchadier et al.

(10) Patent No.: US 9,731,462 B2
(45) Date of Patent: Aug. 15, 2017

(54) MOLD AND METHOD FOR VULCANIZING TIRES

(71) Applicants: COMPAGNIE GENERALE DES ETABLISSEMENTS MICHELIN, Clermont-Ferrand (FR); MICHELIN RECHERCHE ET TECHNIQUE, S.A., Granges-Paccot (CH)

(72) Inventors: Denis Marchadier, Clermont-Ferrand (FR); Tom Petrina, Greenville, SC (US); David Stringer, Greenville, SC (US); Marvin Owen, Greenville, SC (US)

(73) Assignees: COMPAGNIE GENERALE DES ETABLISSEMENTS MICHELIN, Clermont-Ferrand (FR); MICHELIN RECHERCHE ET TECHNIQUE S.A., Granges-Paccot (CH)

( * ) Notice: Subject to any disclaimer, the term of this patent is extended or adjusted under 35 U.S.C. 154(b) by 20 days.

(21) Appl. No.: 14/906,376

(22) PCT Filed: Jul. 22, 2014

(86) PCT No.: PCT/EP2014/065756
§ 371 (c)(1),
(2) Date: Jan. 20, 2016

(87) PCT Pub. No.: WO2015/011157
PCT Pub. Date: Jan. 29, 2015

(65) Prior Publication Data
US 2016/0167326 A1   Jun. 16, 2016

(30) Foreign Application Priority Data
Jul. 22, 2013   (FR) ...................... 13 57206

(51) Int. Cl.
*B29D 30/06*   (2006.01)
*B29K 105/00*   (2006.01)

(52) U.S. Cl.
CPC ..... *B29D 30/0606* (2013.01); *B29D 30/0629* (2013.01); *B29D 2030/0618* (2013.01); *B29D 2030/0631* (2013.01); *B29K 2105/253* (2013.01)

(58) Field of Classification Search
CPC .................. B29D 30/0606; B29D 30/0629
See application file for complete search history.

(56) References Cited

U.S. PATENT DOCUMENTS 3,609,819 A * 10/1971 Searle ................ B29D 30/0629
425/22
3,797,979 A * 3/1974 Greenwood ....... B29D 30/0629
425/451.7

(Continued)

FOREIGN PATENT DOCUMENTS

| EP | 0522374 | 1/1993 |
| JP | 2005246803 | 9/2005 |
| JP | 2010076344 A | 4/2010 |

OTHER PUBLICATIONS

International Search Report for Priority Application PCT/EP2014/065756 dated Oct. 15, 2014.

*Primary Examiner* — James Mackey
(74) *Attorney, Agent, or Firm* — Dickinson Wright PLLC

(57) ABSTRACT

Tire vulcanizing mold able to cooperate with a curing press, said mold comprising two shells each one molding a sidewall of the tire and a ring of sectors for molding the tread of the tire, each sector comprising a support and a molding lining situated radially on the inside of the support, in which ring the sectors, when the mold is in the closed position, are all in circumferential contact one with the next via the molding linings and in radial contact on the shells via the (Continued)

front ends of the linings each of which forms a face for contact with the shell, said supports and linings being produced in such a way that each support is able to take up the clamping force applied to the lining coming into contact with the shell when the mold is in the closed position when said clamping force at said contact face exceeds a given threshold that is lower than the plastic threshold of the lining.

A predetermined clearance (j) is provided between the lower front face of the shell and the lower front end of the support, and in that this clearance (j) is cancelled out when the mold is in the closed position.

7 Claims, 2 Drawing Sheets

(56) References Cited

U.S. PATENT DOCUMENTS

| | | | | |
|---|---|---|---|---|
| 3,989,791 | A * | 11/1976 | Tippin | B29D 30/0629 264/315 |
| 5,269,669 | A | 12/1993 | Ladouce | |
| 5,585,064 | A * | 12/1996 | Moris-Herbeuval | B29C 33/0038 264/102 |
| 5,639,326 | A * | 6/1997 | Soulalioux | B29D 30/0629 156/110.1 |
| 5,939,002 | A * | 8/1999 | Heindel | B29D 30/0606 249/56 |
| 7,637,727 | B2 * | 12/2009 | Hyodo | B29C 33/302 425/46 |
| 2008/0191389 | A1 | 8/2008 | Hyodo | |
| 2010/0140847 | A1 | 6/2010 | Secchi | |

* cited by examiner

MOLD AND METHOD FOR VULCANIZING TIRES

This application is a 371 national phase entry of PCT/EP2014/065756, filed 22 Jul. 2014, which claims benefit of French Patent Application No. 1357206, filed 22 Jul. 2013, the entire contents of which are incorporated herein by reference for all purposes.

BACKGROUND

1. Field

The present disclosure relates to tire vulcanizing molds and, more precisely, to molds of the type having sectors. Vulcanizing molds vulcanize the tire by applying pressure and heat to a tire blank. Vulcanizing molds of the type having sectors are produced as a plurality of components that are assembled and driven by appropriate kinematics in conjunction with the curing press.

2. Description of Related Art

Vulcanizing molds generally comprise sectors that can move radially relative to the axis of the mold. In a vulcanizing mold of this type, the molding space of the exterior surface of the tire is defined by two shells, each one molding a sidewall, and by a ring of sectors or two rings of half-sectors for molding the tread. In vulcanizing molds with radially movable sectors, the sectors are entrained in a radial movement usually by the axial movement of an inclined component, generally a closure ring having an interior surface of frustoconical form that collaborates with the radially exterior surface of frustoconical form of the sectors.

During vulcanizing, the tire blank is subjected to certain conditions of pressure and temperature that cause the unprocessed rubber mixture to become fluid. In order to prevent the formation of molding burrs, the parting lines have to remain leaktight. The lining used to mold the tread is generally produced from an aluminium alloy, using casting techniques. When the mold is clamped in the vulcanizing press to close the sectors, particularly where there is an excessive clamping force, there will be the appearance of crushing phenomena at the aluminium interfaces of the linings and of the steel shells. As the aluminium linings are less resistant than the shells, crushing of the linings gives rise to damage to the mold, resulting in a reduction in its service life and even compliance issues in the case of the tires produced using this mold.

Document EP 0522374, in the name of one of the applicants, relates to the problem of leaktightness between the sectors and proposes a mold composed of two shells and a ring of sectors, each sector comprising a support and a molding lining, and wherein the molding lining is affixed to the support by strips in the form of an arc of a circle, each bearing on one of the ends of the support. Thus, when the mold is in the closed position, the sectors are in contact with one another via the strips that likewise ensure contact between the sectors and the shells, the strips being in elastic compression by virtue of bearing on one another. This document admittedly provides a solution to the problem of leaktightness between sectors but, in order for the mold to be leaktight at the molding joints, requires an adaptation of the linings at the perimeter formed by the strips for affixing the linings. This adaptation is achieved by means of a perimeter shortening of all the molding linings upon first closure of the mold, requiring residual deformation of the linings with, when manufacturing tolerances are excessive, residual tension in the linings. Moreover, this solution requires the use of strips that are additional molding components that make it possible to counter the press forces with a view to limiting crushing of the aluminium linings and thus the reduction in the diameter of the mold generated in order to guarantee the leaktightness of the sectors. These strips thus constitute supplementary interfaces in the tire molding zone and require a high level of operational precision if rubber burrs are to be eliminated.

One solution has been described in document JP 2010-076344, in which a circumferential clearance has been provided between adjacent sectors to compensate for their expansion.

SUMMARY

One object of an embodiment of the invention is to remedy the drawbacks of the aforesaid documents and to provide an original solution to allow the service life of the mold and, thereby, the quality of the tires produced with this mold, to be improved.

This object is achieved by an embodiment of the invention, which proposes a tire vulcanizing mold able to cooperate with a curing press, said mold comprising two shells each one molding a sidewall of the tire and a ring of sectors for molding the tread of the tire, each sector comprising a support and a molding lining situated radially on the inside of the support, in which ring the sectors, when the mold is in the closed position, are all in circumferential contact one with the next via the molding linings and in radial contact on the shells via the front ends of the linings each of which forms a face for contact with the shell, said supports and linings being produced in such a way that each support is able to take up the clamping force applied to the lining coming into contact with the shell when the mold is in the closed position when said clamping force at said contact face exceeds a given threshold that is lower than the plastic threshold of the lining, characterized in that a predetermined clearance is provided between the lower front face of the shell and the lower front end of the support, and in that this clearance is cancelled out when the mold is in the closed position.

In other words, the supports and linings of an embodiment of the invention are produced in such a manner that, when the front end of the lining comes into contact with the shell, but prior to the application of the clamping force at said contact face, a predetermined clearance is provided between the lower front face of the shell and the lower front end of the support. This clearance is then cancelled out when the mold is in the closed position upon application of the clamping force originating from the press. The lining then undergoes elastic deformation after it has come into contact with the shell in order to close up the molding joints. Thus, its deformation at the interface with the shell is limited to the elastic domain, such that the clamping force subsequently applied to fully close the mold is taken up by the support. This thus prevents the appearance of burrs on the lining and thereby defects on the tires after vulcanizing, which means that it is possible to vulcanize a larger number of tires using the mold of the invention.

"When the mold is in the closed position" is understood to mean when the mold is fully closed, ready to vulcanize the tire it encloses. "Clearance provided between the shell and the support or between the lateral faces of two supports" is understood to mean the clearance relative to either the support directly or to an attached component integral therewith. Clearances are determined as a function of mold working conditions, the dimensions of the components that make up the mold, the material from which they are made and the clamping forces applied. Thus, when this predetermined clearance is cancelled out, the clamping forces are taken up at the support, with the result that the lining is less stressed, which makes it possible to achieve a high-quality tire molding.

According to a first embodiment of the invention, said support comprises a lower front end situated in the extension of the front end of the lining, said lower front end being produced in such a way that it comes into contact with the lower front face of the shell when the clamping force at said contact face exceeds a given threshold. This enables production to be simplified, without the need to add supplementary components to the mold.

Advantageously, the support is produced from a material with a compression strength greater than that of the material of the lining. For equivalent contact surfaces of the two mold components, this makes it possible to take up the clamping forces upon closure of the mold by the support, whilst preventing deformations thereof.

According to a second embodiment of the invention, each support comprises a segment and means for affixing said segment to said support. This makes it possible to produce a sector more economically, only the segment being machined so as to meet the condition of predetermined assembly clearance "j" relative to the shell.

Preferably, each segment has a lower front face produced in such a manner as to come into contact with the lower front face of the shell when the clamping force at said contact face exceeds a given threshold. According to this embodiment, the segments take up the clamping forces by means of a radial loop, without, however, participating in the molding of the tire.

Advantageously, a radial clearance "j" is provided between the shell and the lower front end of the support, or between the shell and the lower front face of the segment, which clearance is between 0.05 and 0.1 mm. The values of the clearance have been determined by taking account of the materials of the different components of the mold, their expansions and their manufacturing tolerances for a given range of tires and applied clamping forces. These values have been confirmed by laboratory testing. Preferably, for a mold used to vulcanize a tire for a passenger vehicle or van, this clearance is preferably equal to 0.07 mm.

The object of an embodiment of the invention is likewise achieved with a tire vulcanizing method using a mold according to an embodiment of the invention, said mold comprising two shells each one molding a sidewall of the tire and a ring of sectors for molding the tread of the tire, each sector comprising a support and a molding lining situated radially on the inside of the support, in which ring the sectors, when the mold is in the closed position, are all in circumferential contact one with the next in the circumferential direction via the molding linings and in contact on the shells via their front ends, said mold being able to collaborate with a curing press in order to move from a position in which the mold is open, in which the sectors are separated from one another and separated from the shells, to said position in which the mold is closed, characterized in that closure of the mold is achieved in two steps:
- a first step of placing the front face of the lining in contact with the front face of the shell;
- a second step of applying the clamping force, in which the lining is elastically compressed and allows the force to be taken up by the support, a predetermined clearance being provided between the lower front face of the shell and the lower front end of the support, this clearance being cancelled out when the mold is in the closed position.

BRIEF DESCRIPTION OF DRAWINGS

The invention will be better understood by virtue of the remainder of the description, supported by the following figures:

FIG. 3a is a partial sectional view along a meridian line of a mold according to a second embodiment of the invention and FIG. 3b is a partial sectional view along the plane A-A in FIG. 3a.

DETAILED DESCRIPTION OF SPECIFIC EMBODIMENTS

Figure 1:
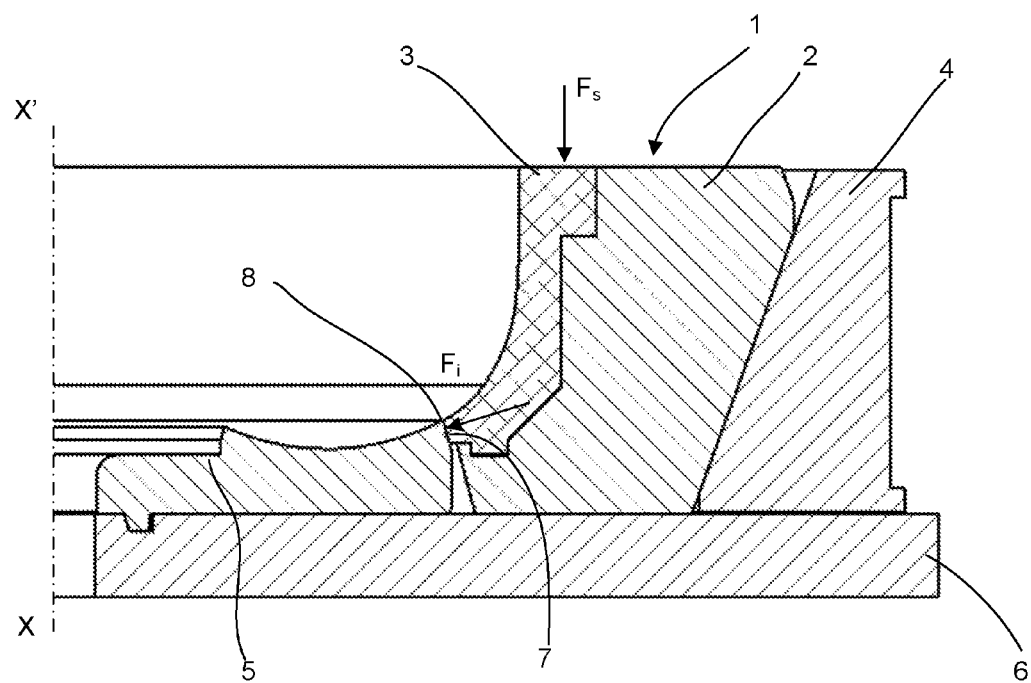
FIG. 1 is a partial sectional view along a meridian line of a mold according to the art.
Figure 2:
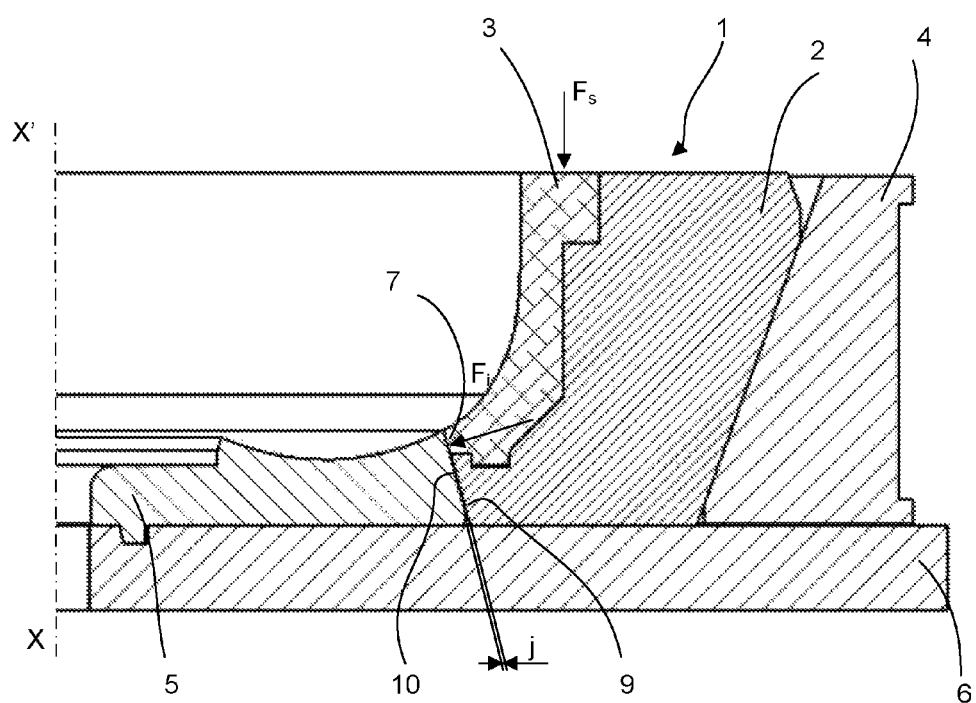
FIG. 2 is a partial sectional view along a meridian line of a mold according to a first embodiment of the invention.
Figure 3A:
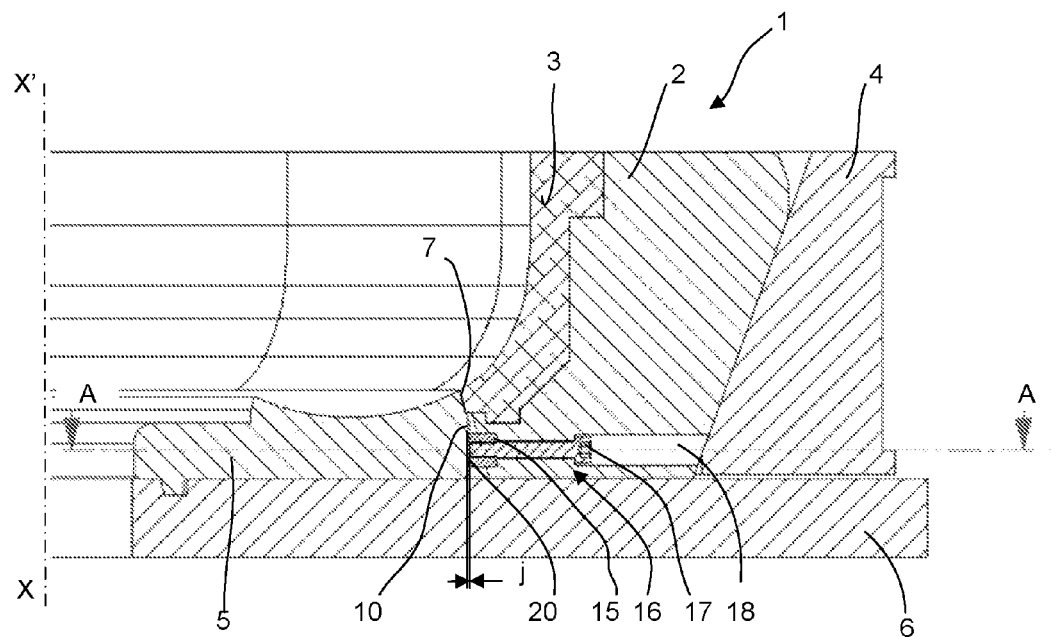

In the various figures, identical or similar elements have the same reference number. Their description is thus not systematically repeated. FIGS. 1, 2 and 3a illustrate, in sectional views along a meridian line, only the lower half of a mold. It is known, in the prior art that, the upper half is the mirror image of the lower half. Thus, the following description applies in the same way to the upper half and to the lower half of the mold.

FIGS. 1 to 3b illustrate, in partial sectional views, a vulcanizing mold in which can be seen a sector 1 that comprises a support 2 generally produced from steel or from cast iron and a molding lining 3 affixed to the support 2. The molding lining 3 is generally produced from an aluminium alloy using a casting technique and bears the negative of the tire tread outline. In a known manner, a plurality of sectors 1 are arranged side-by-side circumferentially about the axis of symmetry X-X' of the mold and form an annulus, the sectors being radially movable when they are actuated by a ring 4. The ring 4 has a radially interior surface of frustoconical form that collaborates with the radially exterior surface of frustoconical form of the sectors 1. Thus, each sector 1 is radially movable when it slides along the inclined surfaces of the ring 4, between a radially interior position when the mold is closed and a radially exterior position when the mold is open. The sectors 1 are guided and held by the ring 4 by virtue of tooling of the type described in document WO 2010019134, which tooling is not shown here. In the closed position, the lining 3 comes into contact with the shell 5 for molding the tire sidewall. The shell 5 and the ring 4 are supported by a plate 6 that serves as interface with the curing press (not shown).

FIG. 1, which shows a sectional view, along a meridian line, of a vulcanizing mold according to the art, shows the lining 3, which is in contact with the shell 5 over a slightly conical surface, the height of which is given by that of the front end 7 of the lining 3. Upon clamping of the mold in the curing press, a clamping force $F_s$ is applied to the sector 1 and its component $F_t$ is applied to the front end of the lining 3 bearing on the shell 5. When the force applied is excessive or the manufacturing tolerances of the components are incompatible, closure of the mold gives rise to crushing of the interface of the lining 3 with the result that burrs appear owing to the imprints left by the upper edge 8 of the shell 5 on the front end 7 of the lining 3.

According to an embodiment of the invention, said supports 1 and linings 3 are produced in such a manner that each support 1 is able to take up the clamping force applied to the lining 3 coming into contact with the shell 5 when the mold is in the closed position, when the clamping force $F_i$ at the contact face of the front end 7 of the lining on the shell 5 exceeds a given threshold. This threshold of the force is lower than the plastic threshold of the lining in order to prevent the appearance of residual deformations thereon. After laboratory testing, for a lining 3 produced from an aluminium alloy operating in temperature ranges of between 150 and 180° C., it has been agreed to reduce the elastic limit Re by 45% and to reduce the elasticity modulus E by 20%, thereby obtaining a threshold value for the elastic limit Re of 44 MPa and a threshold value for the modulus E of 58 000 MPa.

FIG. 2 illustrates a first embodiment of the invention, according to which the support 2 comprises a lower front end 9 situated in the extension of the front end 7 of the lining 3, said lower front end 9 being produced in such a manner as to come into contact with the lower front face 10 of the shell 5 when the clamping force $F_i$ at the interface (or contact face) between the lining 3 and the shell 5 exceeds a given threshold. More particularly, according to this embodiment, a radial clearance "j" is produced between the lower front face 10 of the shell 5 and the lower front end 9 of the support 2.

After having calculated the strength of the materials and defined the necessary ranges of measurements (taking account of manufacturing tolerances of the components and differential expansions between the components of the mold in the case of a lining 3 produced from an aluminium alloy and a support 2 produced from steel), it was established that for a clearance j=0.07 mm the deformation of the lining 3 remains in the elastic domain and the support 2 takes up the clamping forces at the interface. Laboratory testing confirmed that the proposed solution was capable of taking up the different values of the clamping force applied to vulcanizing molds for passenger vehicle and van tires. Thus, in operation, the lining comes first into contact with the shell, and is compressed, but the deformations thereof remain in the elastic domain upon the application of the clamping force originating from the curing press. Elastic crushing of the lining 3 at the interface with the shell 5 successfully cancels out the clearance "j", allowing the support 2 to take up the clamping force via a radial loop.

Figure 3B:
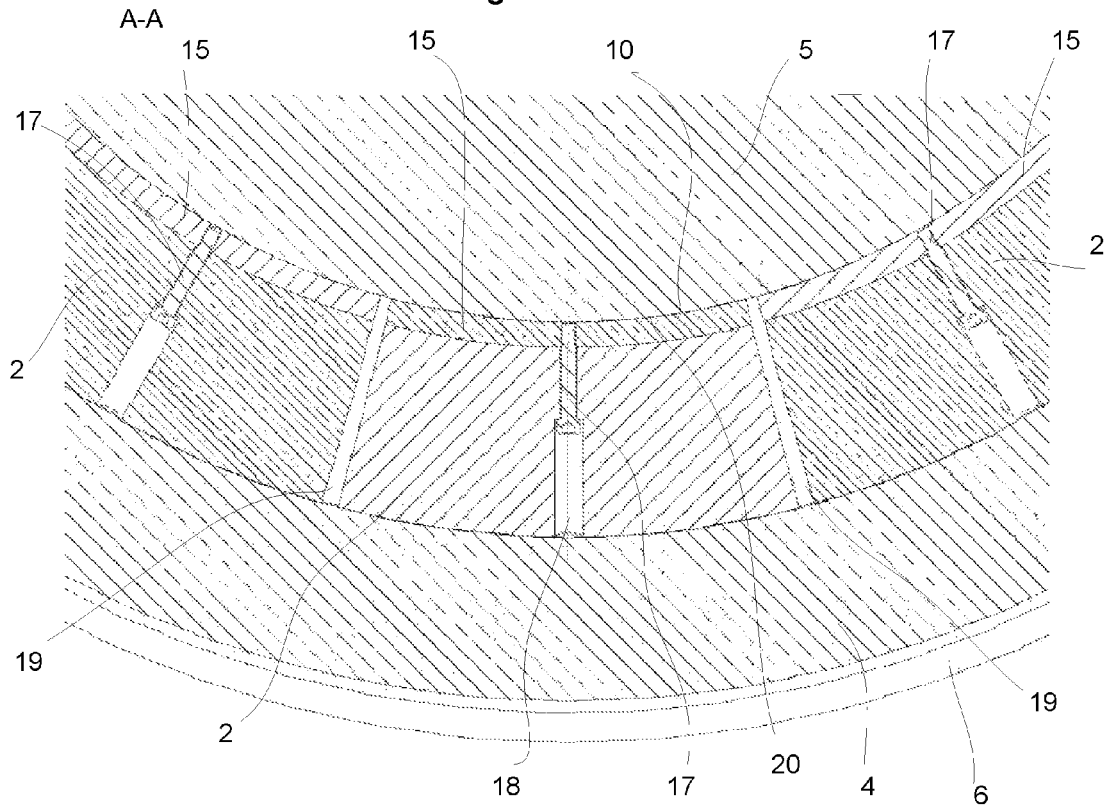

FIGS. 3a and 3b illustrate a second embodiment of the invention. Each support 2 comprises a segment 15 and means 16 for affixing the segment 15 on the support 2. The affixing means 16 are constituted by a threaded rod 17 passing through, with clearance, a hole 18 made in the median part of the support 2 (in the middle of the arc that constitutes the support 2) and is screwed into a threaded hole in the segment 15. Depending on the dimensions of the support 2, a plurality of fastenings, using threaded rods 17, are provided for affixing the segment 15. The segment 15 has a general shape of an arc of a circle (FIG. 3b) and comprises a front face 20 produced so as to come into contact with the lower front face 10 of the shell 5 when the clamping force $F_i$ at the interface (or contact face) between the lining 3 and the shell 5 exceeds a given threshold. More particularly, as in the embodiment in FIG. 2, a clearance "j" is produce between the lower front face 10 of the shell 5 and the front face 20 of the segment 15. The same calculation of the radical clearance "j" and the same hypotheses as described above apply to this embodiment also, and the elastic crushing of the lining 3 at the interface with the shell 5 cancels out the clearance "j", enabling the segment 15 to take up the clamping force by a radial loop. It will be noted in FIG. 3b that the segments 15 solely have the role of radial loop, radial slots 19 being present between adjacent sectors 2 and segments 15 when the mold is in the closed position, and that tire molding is effected solely at the linings 3. This makes it possible to reduce the costs of manufacture of the mold by stamping out all the supports from a single annular cast component, the wastage of material generated by stamping-out corresponding to the width of the slot 19. The same applies to the segments 15, which can also be stamped out from a single annular component. Furthermore, the lateral faces of the supports 2 and of the segments 15 do not come into contact when the mold is in the closed position and can therefore remain in the unprocessed state.

In the embodiments described herein, the linings 3 are produced from aluminium using a casting technique, and all the other mold components (supports 2, shells 5, rings 4, segments 15) are produced from steel or cast iron. In a variant, the support 2 may be produced from an aluminium alloy having a compression strength in excess of that of the material of the lining 3.

Other variants and embodiments of the invention may be envisaged without departing from the scope of the claims.

Thus, it is possible to use different solutions in combination within the context of a single vulcanizing mold. It is thus possible to produce a mold comprising a radial clearance between the shell and the lining support and a circumferential clearance between the lateral faces of the two adjacent sectors, the two clearances being calculated in such a manner that, when the mold is in the closed position, the lining is deformed elastically and the clamping forces are taken up at the supports of the linings.

The invention claimed is:

1. A tire vulcanizing mold adapted to cooperate with a curing press, said mold comprising:
   two shells, each one molding a sidewall of the tire, and
   a ring of sectors for molding the tread of the tire, wherein each sector comprises:
      a support, and
      a molding lining situated radially on the inside of the support, and having a plastic threshold
   wherein the sectors of the ring, when the mold is in the closed position, are all in circumferential contact one with the next via the molding linings and in radial contact on the shells via front ends of the molding linings, each of which forms a face for contact with the shell,
   wherein said supports and linings are produced in such a way that each support is able to take up a clamping force applied to the lining coming into contact with the shell when the mold is in the closed position when said clamping force at said contact face exceeds a given threshold that is lower than the plastic threshold of the lining, wherein a predetermined clearance (j) is provided between a lower front face of the shell and a lower front end of the support, and wherein this clearance (j) is cancelled out when the mold is in the closed position.

2. The mold according to claim 1, wherein said support comprises a lower front end situated in an extension of the front end of the lining, said lower front end being produced in such a way that it comes into contact with the lower front face of the shell when the clamping force at said contact face exceeds a given threshold.

3. The mold according to claim 1, wherein the support is produced from a material with a compression strength greater than that of the material of the lining.

4. The mold according to claim 1, wherein each support comprises a segment and means for affixing said segment to said support.

5. The mold according to claim 4, wherein each segment has a lower front face produced in such a manner as to come into contact with the lower front face of the shell when the clamping force at said contact face exceeds a given threshold.

6. The mold according to claim 1, wherein a radial clearance "j" is provided between the shell and the lower front end of the support, or between the shell and the lower front face of the segment, which clearance is between 0.05 and 0.1 mm.

7. A tire vulcanizing method using a mold according to claim 1, said mold comprising two shells each one molding a sidewall of the tire and a ring of sectors for molding the tread of the tire, each sector comprising a support and a molding lining situated radially on the inside of the support, in which ring the sectors, when the mold is in the closed position, are all in circumferential contact one with the next in the circumferential direction via the molding linings and in contact on the shells via their front ends, said mold being able to collaborate with a curing press in order to move from a position in which the mold is open, in which the sectors are separated from one another and separated from the shells, to said position in which the mold is closed, characterized in that closure of the mold is achieved in two steps:
- a first step of placing the front face of the lining in contact with the front face of the shell;
- a second step of applying the clamping force, in which the lining is elastically compressed and allows the force to be taken up by the support, a predetermined clearance (j) being provided between the lower front face of the shell and the lower front end of the support, this clearance (j) being cancelled out when the mold is in the closed position.

* * * * *